United States Patent Office 3,849,526
Patented Nov. 19, 1974

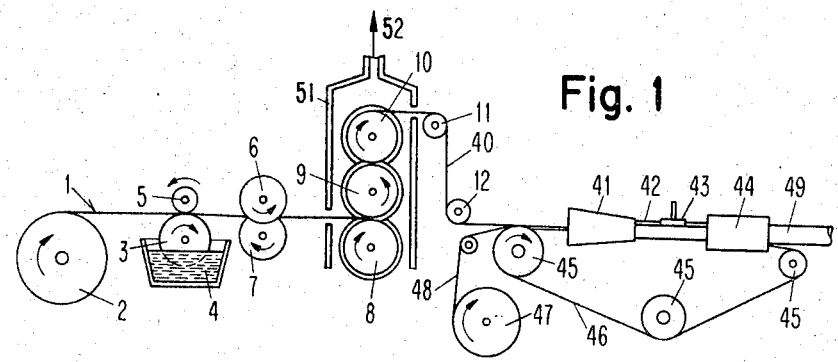
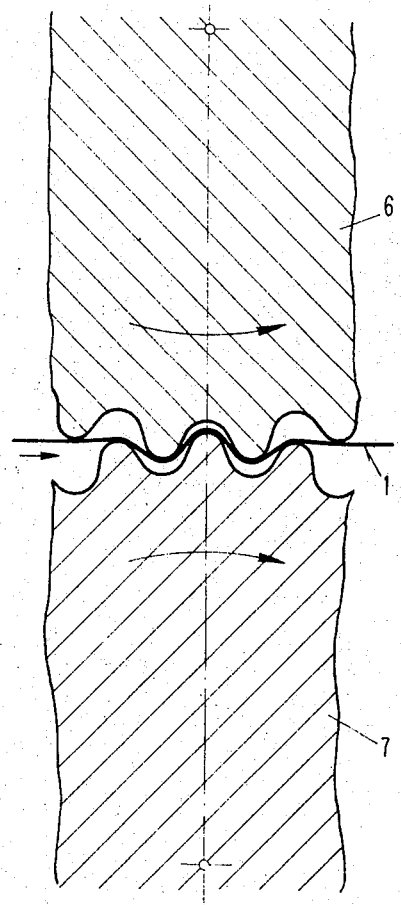
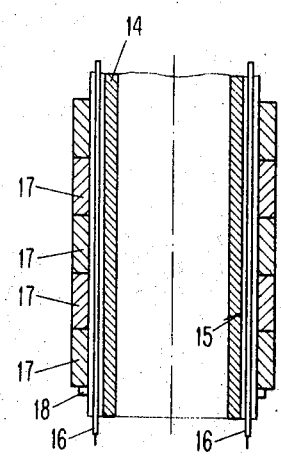
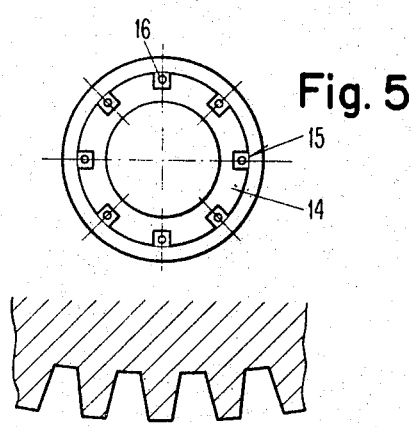
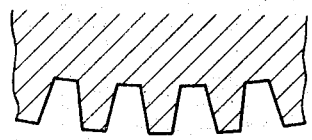
Fig. 1
Fig. 2
Fig. 3
Fig. 4
Fig. 5

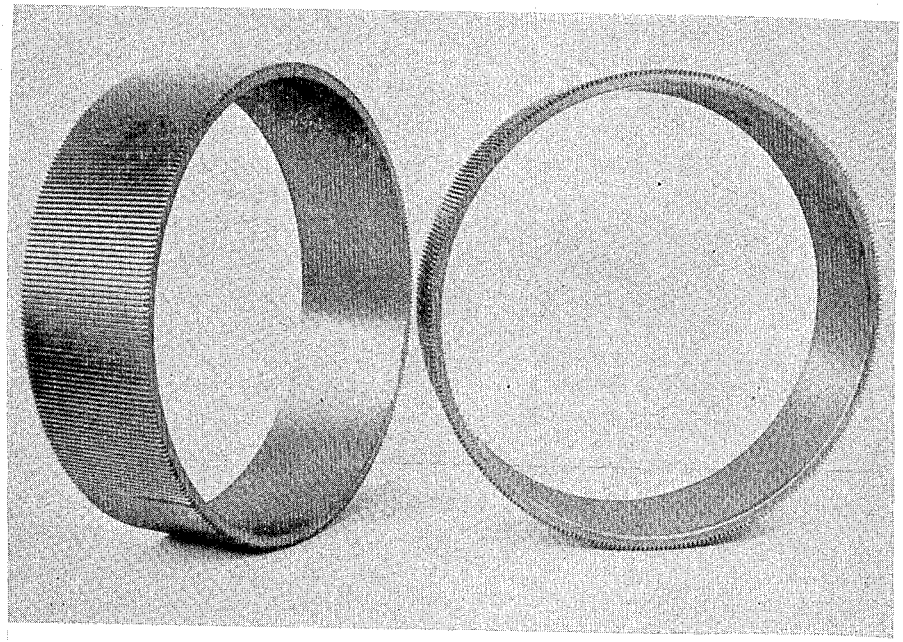
Fig. 6
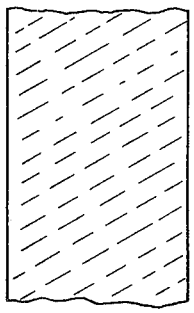 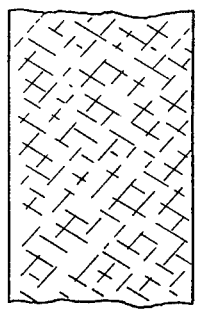 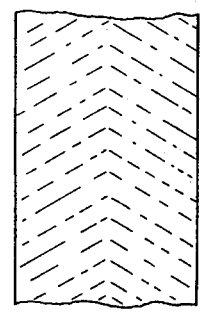
Fig. 10  Fig. 11  Fig. 12

3,849,526
METHOD OF MAKING WEBS OF FILTER
MATERIAL
Paul Adolf Muller, 9497 Triesenberg 405, Liechtenstein, and Hans Muster, 8340 Hadlikon-Hinwil, Switzerland
Filed July 8, 1971, Ser. No. 161,366
Claims priority, application Switzerland, May 13, 1971, 7,064/71
Int. Cl. A24c 5/50; B29c 24/00
U.S. Cl. 264—286
4 Claims

ABSTRACT OF THE DISCLOSURE

An elongated web of paper is treated to render it especially suitable for being gathered transversely and wrapped to make cigarette filters. The treatment includes passing the web through the bight between a pair of rotating rolls provided with intermeshing ribs that do not contact one another and which are arranged generally in planes paralled to their axis of rotation so that the paper is stretched longitudinally in successive transverse areas whereby the paper fibers are loosened and exposed in such areas without complete destruction of the longitudinal continuity of the web. Thereafter the paper is passed through the bight between another pair of rolls provided with narrowly spaced circumferentially intermeshing ribs which do not contact one another and are arranged generally in planes normal to the axis of the rolls so that the paper is grooved paralled to the travel of the web and stretched transversely of these grooves to loosen and expose the fibers even more without destroying the transverse continuity of the web.

---

The present invention relates to an improved method for the economical production of webs of filtering material, particularly of longitudinally grooved paper webs with loosened and exposed fibers, suitable for gathering laterally into a filter cord which may be subdivided into filter rods and filter plugs for cigarettes and other tobacco products. Gathering and wrapping of the longitudinally grooved web of material or paper may be effected immediately following the grooving step or the longitudinally grooved webs may be wound onto rolls or bobbins, stored and subsequently supplied to conventional cording machines to produce a wrapped filter cord and subdividing the same into filter rods.

Longitudinally grooved webs of material or paper are already known and described in the U.S. Pat. Nos. 2,995,481, 3,179,024, 3,161,557, 3,226,280, 3,466,358. In the production of such longitudinally grooved webs the paper is passed through the gap between intermeshing metal rolls provided with annular ribs, care being taken that the longitudinal grooving of the paper web is effected at least partly at the expense of the paper thickness. During the process the web of material cannot move transversely to the direction of travel and is thus stretched in the transverse direction. It is of advantage in this process to make the paper ductile prior to subjecting it to longitudinal grooving so that the transverse continuity of the paper web is not destroyed also when transverse stretching is increased, although such transverse stretching may be increased until discontinuous short longitudinal tears appear in the paper. After passing between the intermeshing metal rolls the web of material or paper provided with longitudinal grooves is dried.

According to a further development of this method, which is also known, the web of material, after emerging from the gap, is left to rest, along a predetermined looping angle, on at least one of the heated rolls and thereby partly dried in parallel longitudinal areas, stiffened and its loosened structure fixed. Subsequently the web of material resting on the said roll may be passed through a second gap between the said roll and a third identical roll then to be taken over by the third roll or left to rest on the same along a looping angle as per U.S. Pat. Nos. 3,226,280, 3,466,358.

The said methods have stood the test of time and are commercially applied to a wide extent in making paper cigarette filters.

According to the said method the web of material is commonly moistened prior to its passing into the first gap between the intermeshing rolls with annular ribs, and accordingly dried afterwards. If the speed of the web to be treated is increased in order to increase hourly production, i.e. to run the machines involved as economically as possible, the time available for moistening one centimetre web length gradually decreases and the energy consumption for drying increases on the other hand. These difficulties are greatly reduced if the web of material is moistened, prior to its entry into the gap, with a volatile impregnating agent which is later removed therefrom after its emergence from the gap as disclosed in U.S. Pat. No. 3,621,764. Designated as volatile impregnating agents are such liquids of which the boiling point is below the boiling point of water at the atmospheric pressure prevailing, and which have a heat of evaporation lower than that of water, preferably less than 250 cal./kg., such as alcohol and acetone.

The longitudinal grooving and transverse stretching of paper webs according to the above-mentioned methods causes fibres to be exposed from the paper until a plurality of short discontinuous longitudinal tears appear but without causing the transverse continuity of the paper web to be destroyed. This fraying then results in the great retaining power for undesirable liquid and solid particles from the tobacco smoked therethrough, which is a well-known property of cigarette filters made of such paper webs.

It was therefore natural to endeavour further to increase the fraying of such longitudinally grooved paper webs. By way of example, as disclosed in the above-mentioned patents, the longitudinally grooved paper web was to this end passed through a pair of so-called knurling rolls or provided with perforations or embossing prior or subsequent to being longitudinally grooved. Multiple subsequent grooving and simultaneous transverse stretching with increasing depths of the annular ribs has also been suggested and tested. (U.S. Pat. Nos. 3,466,358, 3,519,521.)

All these measures also resulted in a certain increase in the retention of filter plugs made of such paper webs.

The present invention has for its object to increase the fraying of such webs of material and, respectively, paper in order to be able to produce filter plugs with a determined retaining action with a smaller consumption of material than previously. The invention is characterized by the fact that the web of material is longtitudinal stretched in a first direction in a plurality of consecutive paralled transverse areas so that the fibre structure is loosened whereupon the web of material is subjected to at least one further stretching process in transverse direction in a plurality of consecutive parallel longitudinal areas to facilitate the gathering of the web while the continuity of the web of the material is preserved despite the stretched areas.

The invention further relates to an apparatus for the performance of this method comprising an unrolling device for a web of material from a supply roll and guide means for the web of material through processing stations arranged behind one another in the direction of travel. The apparatus is characterized by at least two processing stations designed to stretch the web of material passing therethrough, each of the said stations being equipped with driven rolls with intermeshing ribs on the surface, which do not however, contact one another, the direction of the ribs relative to the axis of rotation of the rolls being different in consecutive processing stations.

A number of embodiments of this invention will now be described in greater detail with reference to FIGS. 1 through 12 of the drawing which FIG. 1 is a diagrammatic side elevation of an embodiment of an apparatus for the performance of the method according to this invention;

FIG. 2 is an enlarged cross-sectional view of the intermeshing stretching rolls 6 and 7 of the apparatus according to FIG. 1 in a diretion normal to their axes of rotation;

FIG. 3 is a cross-sectional view of another embodiment of the stretching roll 6 according to FIG. 2;

FIGS. 4 and 5 show a longitudinal section and, respectively, a side elevation of a further embodiment of a stretching roll 6 and, respectively, 7, of the apparatus according to FIG. 1;

FIG. 6 is a photograph of the stretching rings for a stretching roll according to FIGS. 4 and 5;

Figure 8:
Figure 9:
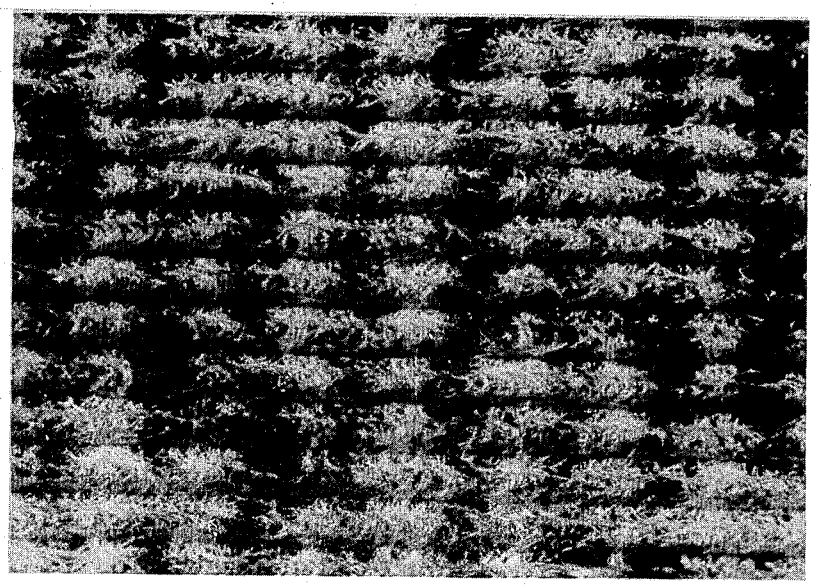

FIGS. 8 and 9 are enlargements at the scale 1:10 of a photograph of paper webs, and FIGS. 10 through 12 are views from above of paper webs with obliquely oriented stretched areas in diagrammatic representation.

According to a preferred embodiment of the present method for the processing of a flat and smooth fibre-containing paper web, the latter is first made ductile. Such a paper web which may by way of example consist of only slightly ground fibres but possesses adequate wet tearing strength and a weight of 30–40 g./m.$^2$, may be made ductile by moistening with water or other suitable, preferably volatile, liquids such as alcohol, acetone and the like.

In the embodiment of a suitable apparatus therefor diagrammatically shown in FIG. 1, the paper web 1 passes, from the supply roll 2, through the moistening station formed by the rolls 3 and 5 and is moistened with the liquid 4. It is naturally possible to employ other methods known in the paper-processing industry, i.e. spraying with liquid or the use of wet or hot stream.

However, a continuously operating method of moistening the paper web must be employed since the paper web is called upon to pass through the apparatus according to FIG. 1 at high speeds of up to 400 m./min.

The moistened paper web is in this embodiment first stretched in the longitudinal direction, two parallel narrow areas spaced by e.g. 4 mm. being held stationary while the intermediate area of the paper web is forced upwards or downwards by e.g. 1.5 mm. normally to the paper surface. This causes the paper web to be stretched in the longitudinal direction thereof and the transverse zone previously 4 mm. wide obtains a width of about 5.5 mm., which corresponds to longitudinal stretching by about 35 percent. If this longitudinal stretching is effected in consecutive transverse areas, an elongation of the entire paper web by over 20–30 percent can be observed which is obtained at the expense of the paper thickness of the longitudinally transverse areas.

In the apparatus according to FIG. 1 longitudinal stretching is effected by the two associated rolls 6 and 7 which are shown in enlarged condition in FIG. 2. These rolls 6 and 7 are provided with transverse ribs arranged in parallel with the axes of rotation which intermesh similarly to two toothed wheels of a gear but without contacting one another. Both rolls 6 and 7 are driven in the direction of the arrow while their speed of revolution can be adjusted relative to the drive that determines the speed of the paper web 1. As indicated in FIG. 2 the paper web 1 passing between the two rolls 6 and 7 in the direction of the arrow is stretched in the direction of its travel by the intermeshing transverse ribs since the latter grip parallel and closely adjacent transverse areas of the paper web 1. The configuration of the transverse ribs is shown rounded in the cross-section of FIG. 2, which is possible with rolls of a sufficiently large diameter since several of the consecutive transverse ribs of the two rolls grip the passing web of paper 1 and prevent the paper from slipping over the transverse ribs in the direction of its travel and from being stretched.

Where the diameter of the rolls 6 and 7 is smaller, it may be of advantage to use transverse ribs with angular cross-sectional configuration as indicated in FIG. 3. By way of example, a roll diameter of 80 mm. secured longitudinal stretching of the paper webs by 30–50 percent with transverse ribs which possessed substantially the cross-sectional configuration according to FIG. 3 with a tangential width of the exterior rib face of 1.5 mm., a rib distance from centre to centre of 6 mm. and a groove depth of about 2.5 mm.

A preferred embodiment of the constructional design of such a longitudinal stretching roll is shown in FIGS. 4 and 5. Each roll consists of a hollow core roll 14 which is provided with a number of grooves 15 evenly distributed over its circumference which heating rods 16 in an insulating sheath are arranged. These heating rods are electrically connected to appropriate slip-rings on the axle of the core roll (not shown) and connected, via appropriate brushes, to an exterior and preferably adjustable current source. Slipped over the core roll 14 are consecutive rings 17 of which the exterior surface is provided with transverse ribs of the configuration shown in FIG. 2 and, respectively, 3 and which are mutually so adjusted by means of pins and bores that the transverse ribs of the various rings 17 register accurately so that the core roll 14 so provided with such rings 17 forms a stretching roll with continuous transverse ribs. The rings 17 are forced, by means of an elastic compressing spring, against one another and against the stop ring 18 in order to allow for axial expansion, if any, during heating. FIG. 6 shows an embodiment of such rings 17 with an inner diameter of about 160 mm., an axial width of 60 mm. and transverse ribs of the configuration shown in FIG. 3 with an exterior rib face of about 1 mm. tangential width.

The ductile paper web 1 emerging from the moistening station 3, 4, and 5 of FIG. 1 is thus stretched and elongated in the direction of its travel as it passes between the longitudinally stretching rolls. While such a paper web reveals consecutive transverse areas with a loosened fibre structure and a plurality of exposed fibres, it would not be directly suitable after drying for being processed into a wrapped filter cord for the production of filter rods and filter plugs since it would to this end have to be gathered in the transverse direction, which would hardly be possible owing to the non-loosened transverse areas which have stiffened again after drying. Much rather, the longitudinally stretched paper web must preferably be provided, in still moist and not fully dried condition, with closely adjacent longitudinal grooves in the known manner described in the above-mentioned patents. For this purpose the paper web is supplied to a grooving station with the heatable grooving rolls 8, 9, 10 which are provided with closely adjacent intermeshing annular ribs which do not, however, contact one another. Simultaneously with longitudinal grooving, stretching in the transverse direction is effected and the paper web, so stretched in two different directions and so loosened and frayed, leaves the grooving station via the guide rollers 11 and 12. Since the paper web is left to rest, in the grooving station, on the rolls 9 and 10 along a looping angle of about 180° it is at least partially dried, particularly if it has been moistened with a volatile impregnating agent 4 which may be removed by means of a hood 51 and the tube 52 so as to be recovered.

The rolls 8, 9, 10 of the grooving station are preferably of the same constructional design as the longitudinally stretching rolls described with reference to FIGS. 4 and 5 with the difference, however, that the rings to be slipped over them have no transverse ribs as per FIGS. 2 and 3 but annular ribs.

Thanks to the similar constructional design of the longitudinally stretching rolls 6, 7 and the grooving rolls 8, 9, 10 it is possible by adjustment of the heating energy to determine the degree of dryness of the paper web in the longitudinally stretching station and in the grooving station to conditions prevailing at the time. In addition, the higher speed of revolution of the rolls 8, 9, 10 in the grooving station, necessary owing to the elongation of the paper web in the longitudinally stretching station 6, 7, may be readily adjusted via an adjustable step-up gear and, if desired, be automatically controlled in the known manner by a feeler bearing on the paper web and influencing this gear. Again, it may also be of advantage between the drive of the moistening station and the longitudinally stretching station 6, 7 to provide a manual or automatic speed regulation.

The longitudinally grooved paper web 40 coming from the grooving station and passing over the guide rollers 11 and 12 and largely freed from the impregnating agent is directly supplied to the inlet funnel 41 of a cording machine of known design together with the wrapping strip 48 which is supplied by the supply roll 47. Emerging from the funnel 41 the transversely gathered and longitudinally grooved web is a wrapped cylindrical cord of, by way of example, 8.0 mm. diameter; the proud edge 42 of the wrap is supplied with an adhesive by the device 43, turned over and glued during the passage through the heated moulding tool 44 so that the wrapped and finished filter cord 49 is formed. In order to overcome friction, the endless conveyer belt 46 passes over the guide rollers 45 and through the funnel 41 as well as the moulding tool 44. The finished endless filter cord 49 is then commonly subdivided into filter rods of a length of 66 to 120 mm., corresponding to six times the length of the filter plugs desired.

Of course there exists the possibility disclosed in the above-mentioned patents to supply the paper web 40 passing over the guide rolls 11, 12 to a cording machine not directly but first to wind them into a bobbin and to unwind them from such a roll on a cording machine at a later date and to process it into a wrapped filter cord and, respectively, filter rods and filter plugs. If desired, the paper web 40 may be fully freed from impregnating agent possibly still present in the paper after passing the guide pulley 11 or 12 when passing through a drying device and only afterwards be supplied to the inlet funnel 41 of a cording machine or wound on a bobbin.

Figure 7:
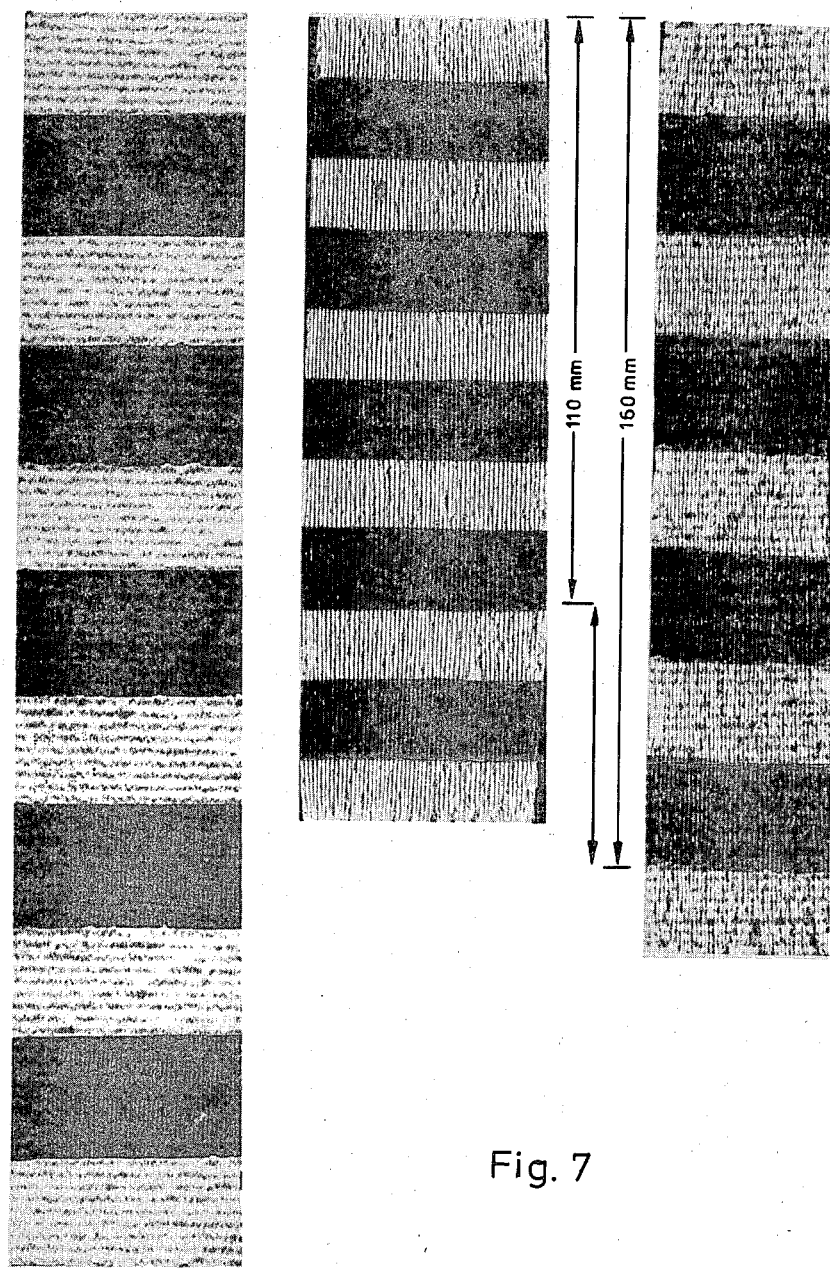
FIG. 7 is a photographic view of three samples of paper webs 40 produced with an apparatus according to FIG. 1.

Samples of the paper webs that can be produced with an apparatus according to FIG. 1 are shown in FIG. 7, longitudinally stretching rolls of the design shown in FIG. 3 with a diameter of 80 mm. having been employed and grooving rolls with annular ribs with 0.3 mm. wide faces, arranged at a distance of 1 mm. centre to centre and about 1.5 mm. groove depth. A base paper web of 210 mm. width and 35 g./m.$^2$ was used and water employed as the moistening agent. The speed was set at about 60 m./min., the longitudinally stretching rolls were not heated and the heating of the grooving rolls was so adjusted that the paper web coming from the grooving station was virtually dry. In order to make the elongation of the paper web according to the present method visible, the paper web had printed upon it parallel black transverse lines. The samples of FIG. 7 were removed after the guide pulley 12 in the three different operating conditions described below:

Sample A

The longitudinally stretching rolls 6, 7 were disengaged and the paper web provided with longitudinal grooves only in the grooving station and stretched in the transverse direction until the short discontinuous longitudinal tears appeared which are clearly visible in FIG. 7A. The paper web so produced corresponds to the paper described in the above-mentioned patents and largely used commercially for cigarette filters.

Sample B

This sample is now designed to show the effect of the longitudinally stretching rolls 6, 7 which is why the grooving rolls 8, 9, 10 were disengaged and used only for drying the paper web moving on them. Accordingly, sample 7B shows only parallel transverse areas with a loosened fibre structure caused by the longitudinal stretching by the intermeshing transverse ribs of the rolls 6, 7. The elongation of the paper web by the longitudinal stretching process between the rolls 6, 7 is evident.

Sample C

This paper web was produced according to the present method, i.e. it was first stretched by means of the longitudinally stretching rolls 6, 7 in the longitudinal direction and then provided with longitudinal grooves in the grooving station by the rolls 8, 9 10 while at the same time being stretched in the transverse direction. The paper web according to sample C was produced directly following that according to sample A, all settings on the stretching rollls 6, 7 were additionally caused to intermesh. Accordingly, samples A and C can be compared with each other directly and reveal the elongation of the paper web by a combination of longitudinal stretching and longitudinal grooving and transverse stretching in the ratio of 160:110, i.e. by about 45 percent. In comparing FIG. 7C with FIG. 7A, the substantially more pronounced loosening of the fibre structure becomes visible which naturally results in heavier fraying.

Normal filter rods of 8.0 diameter and 66 mm. length were made of paper webs of 280 mm. width and 33 g./m.$^2$ at a web speed of about 150 m./min.; at first (Type D) only with longitudinal grooving and transverse stretching, subsequently with additional longitudinal stretching (Type E). In the usual known manner the resistance to pulling in mm. water column with an air stream of 17.5 cubic centimeter per second was determined for the filter rods. The mean value calculated on the basis of 40 filter rods amounted to

| Paper web | Resistance to pulling, mm. | Weight of 10 rods, g. |
|---|---|---|
| Type D | 120 | 7.40 |
| Type E | 140 | 5.80 |

This shows that a saving in weight due to the elongation of the paper web of only 1.60 g. for 10 rods or about 21 percent was achieved only while at the same time the resistance to pulling of the D filter rods rose by about 16 percent. If the paper web of Type E were also converted into filter rods of 120 mm. resistance to pulling a quantity of paper about 16 percent lower would be required. The overall saving in paper by the combination of longitudinal stretching and longitudinal grooving with transverse stretching would thus very likely amount to 37 percent.

Naturally the obtainable elongation of the paper web and the increase in the fraying of the paper heavily depend on the adjustment of the longitudinally stretching station and the grooving station. However, the combination of the consecutive stretching of the paper web in different directions and with suitable adjustment of the longitudinally stretching rolls and the grooving rolls, substantial savings may readily be achieved in terms of paper consumption for comparable filter rods. Since the cost of the paper used in the commercial production of paper filters, particularly for cigarettes, normally amounts to more than one half of the overall production costs, savings in paper are significant if they exceed e.g. 20 percent.

The improved fraying of the paper webs that may be achieved by means of a combination of longitudinal stretching and longitudinal grooving with transverse stretching is visible from the photograph of FIG. 8, which represents a paper web processed only by longitudinal grooving with transverse stretching in the known manner, in comparison with the paper web shown in FIG. 9, which has been subjected, according to the present method, first to longitudinal stretching and subsequently to longitudinal grooving with transverse stretching. The scale of enlargement is the same in both photographs, and the two paper webs were produced consecutively in the same apparatus. The grooving rolls were provided with rectangular annual ribs with a face width of 0.3 mm. and 0.7 mm. groove width; the longitudinally stretching rolls additionally caused to intermesh for the paper web according to FIG. 9 were equipped with transverse ribs of the configuration indicated in FIG. 3 with a face width of 1 mm. and 2 mm. groove width. Both paper webs clearly show the longitudinal grooves extending in the longitudinal direction (arrow in FIG. 8) and FIG. 9 shows the thinned areas transversely extending at a distance of about 20 mm. which were produced by longitudinal stretching.

Mention is here made of the fact that, despite the considerable longitudinal stretching of the paper webs shown in FIGS. 7C and 9, the continuity of the paper web in the longitudinal direction has by no means been fully destroyed and that no difficulties arise in the passage of the paper web through the subsequent stations of the apparatus according to FIG. 1.

The embodiment of an apparatus for the performance of the present method described with reference to FIG. 1 is equipped with a grooving station provided with three heatable rolls 8, 9, 10. If desired, a grooving station equipped with only two rolls 8 and 9 may be employed and the longitudinally grooved paper web emerging from the gap between the said rolls may be allowed to continue horizontally without resting on the surface of the roll 9. It is then recommended, however, that the paper web be first allowed to pass through a drying device before it is supplied to the inlet funnel 41 of a cording machine or wound onto the roll. It may also be stated that many types of raw paper are sufficiently ductile without being previously moistened so that they can be supplied directly to the longitudinally stretching station and then to the grooving station, which renders heating of any kind of the rolls of such stations superfluous.

What we claim is:

1. The method of treating an elongated web of fibrous material to render the same particularly adapted to be gathered transversely and enclosed in a wrapper to make a filter cord subdividable into filter rods and filter plugs for cigarettes, the steps comprising:

advancing an essentially in elastic web of the material through the bight between a pair of meshing rotating rolls provided with narrow longitudinal grooves parallel to the axes of the rolls alternating with narrow longitudinal ribs parallel to the axes of the rolls which engage the web and prevent appreciable longitudinal contraction thereof so that the web is stretched longitudinally to loosen and expose fibers in a plurality of closely-spaced successive narrow areas disposed transversely of the web without substantial impairment of the longitudinal continuity of the web; and advancing the longitudinally stretched web through the bight between a pair of non-contacting meshing rotating rolls provided with narrow circumferential grooves alternating with narrow circumferential ribs which engage the web and prevent appreciable lateral contraction thereof to groove the web in a direction parallel to its travel and stretched transversely of the grooves to loosen and expose fibers in a plurality of closely-spaced narrow longitudinal areas without substantial impairment of the transverse continuity of the web.

2. A method according to claim 1 including the step, prior to the first-mentioned stretching step, of moistening the material and characterized by the fact that the material is largely freed from the moistening agent only after the last-mentioned stretching step.

3. A method according to claim 1 including the steps of moistening the material prior to the first-mentioned stretching step, and heating the material during at least one of the stretching steps and thereby at least partly freeing the material from the moistening agent.

4. The method of treating an elongated web of fibrous material to render the same particularly adapted to be gathered transversely and enclosed in a wrapper to make a filter cord subdividable into filter rods and filter plugs for cigarettes, the steps comprising:

moistening an essentially inelastic web of the material to soften and render the same yielding;

longitudinally stretching the material of the softened web to form therein closely-longitudinally-spaced narrow zones of lesser thickness extending laterally of the web where the fibers of the material are somewhat separated;

longitudinally grooving the softened longitudinally-stretched web while preventing any substantial transverse contraction thereof to both form therein a plurality of closely-spaced narrow longitudinally corrugations and laterally stretch the material of the softened web to form therein closely-laterally-spaced narrow zones of lesser thickness extending longitudinally of the web where the fibers of the material are somewhat separated; and drying the corrugated stretched web to stiffen the same and set said corrugations therein.

References Cited

UNITED STATES PATENTS

| | | | |
|---|---|---|---|
| 2,995,481 | 8/1961 | Müller | 156—207 X |
| 3,161,557 | 12/1964 | Müller | 156—46 Z |
| 2,826,239 | 3/1958 | Villoresi | 264—287 X |
| 2,996,425 | 8/1961 | Hamilton | 156—183 X |
| 3,226,280 | 12/1965 | Muller | 425—369 X |
| 3,466,358 | 9/1969 | Muller | 264—287 |
| 3,470,053 | 9/1969 | Rule | 425—369 X |

ROBERT F. WHITE, Primary Examiner

W. E. HOAG, Assistant Examiner

U.S. Cl. X.R.

264—287, 289